(12) United States Patent
Bodiya et al.

(10) Patent No.: US 11,747,585 B2
(45) Date of Patent: Sep. 5, 2023

(54) OPTICAL COMBINER AND COMBINER LENS WITH LIGHTGUIDE FAILURE MITIGATION MECHANISM

(71) Applicant: GOOGLE LLC, Mountain View, CA (US)

(72) Inventors: Timothy Paul Bodiya, Toronto (CA); Daniel Robert Adema, Kitchener (CA); Syed Moez Haque, Kitchener (CA); Andrew S. Logan, Waterloo (CA); Dwayne Wasylyshyn, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 275 days.

(21) Appl. No.: 17/012,369

(22) Filed: Sep. 4, 2020

(65) Prior Publication Data

US 2021/0063672 A1    Mar. 4, 2021

Related U.S. Application Data

(60) Provisional application No. 62/895,721, filed on Sep. 4, 2019.

(51) Int. Cl.
*G02B 7/02*    (2021.01)
*G02B 27/01*   (2006.01)

(52) U.S. Cl.
CPC ........... *G02B 7/02* (2013.01); *G02B 27/0172* (2013.01); *G02B 2027/0178* (2013.01)

(58) Field of Classification Search
CPC ............ G02B 27/0081; G02B 27/0172; G02B 27/4272; G02B 7/02; G02B 6/0081; G02B 2027/0178
See application file for complete search history.

(56) References Cited

U.S. PATENT DOCUMENTS

| | | | | |
|---|---|---|---|---|
| 2019/0178713 | A1* | 6/2019 | Lee | G01J 3/0256 |
| 2020/0057304 | A1* | 2/2020 | Lu | G02B 1/002 |
| 2020/0278543 | A1* | 9/2020 | Schultz | G02B 27/4277 |
| 2021/0247568 | A1* | 8/2021 | Shi | G02B 6/10 |

\* cited by examiner

*Primary Examiner* — Priyank J Shah

(57) ABSTRACT

An optical combiner includes a lightguide having an input region, an output region, a relay region intermediate between the input region and the output region, and one or more stress raisers positioned to define a line of weakness in the lightguide. The line of weakness is intermediate between the input region and the output region and extends across the relay region. An in-coupler is disposed at the input region to receive an incident light with a field of view and couple the incident light into the lightguide. An out-coupler is disposed at the output region to couple light out of the lightguide. The optical combiner may be integrated with one or more lenses for use as a combiner lens in a wearable heads-up display.

23 Claims, 10 Drawing Sheets

OPTICAL COMBINER AND COMBINER LENS WITH LIGHTGUIDE FAILURE MITIGATION MECHANISM

BACKGROUND

Wearable heads-up displays (WHUDs) are wearable electronic devices that use optical combiners to combine real world and virtual images. The optical combiner may be integrated with one or more lenses to provide a combiner lens that may be fitted into a support frame of a WHUD. The combiner lens would provide an eyebox that is viewable by a user when the WHUD is worn on the head of the user. One optical combiner class uses a lightguide (or waveguide) to transfer light. In general, light from a projector of the WHUD enters the lightguide of the combiner through an in-coupler, propagates along the lightguide by total internal reflection (TIR), and exits the lightguide through an out-coupler. If the pupil of the eye is aligned with one or more exit pupils provided by the out-coupler, at least a portion of the light exiting through the out-coupler will enter the pupil of the eye, thereby enabling the user to see a virtual image. Since the combiner lens is transparent, the user will also be able to see the real world.

In WHUDs that use laser projectors, laser safety is of concern. In the case of the WHUD using a lightguide-based optical combiner, there is a risk of fracturing the lightguide, e.g., if the user accidentally drops the WHUD on a hard surface such that the lightguide is subjected to loads that exceed the fracture strength of the lightguide. If a fractured lightguide is used to transfer light, uncontrolled light leakage is likely to occur at the fracture(s) in the lightguide. If the pupil of the eye happens to be aligned with the fracture(s), the leaking light may enter the pupil of the eye and impinge on the retina.

In some cases, a much higher laser power than would ultimately be delivered to the eye may be coupled into the lightguide. As an example, the much higher laser power may have been selected to accommodate inefficiencies in the system such that when the laser light is coupled out of the lightguide by the out-coupler, the appropriate level of laser power will be delivered to the eye to achieve a display with the appropriate brightness. In cases where light with a relatively high level of laser power is coupled into a fractured lightguide, there is a risk of exposing the eye to unsafe laser power levels.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
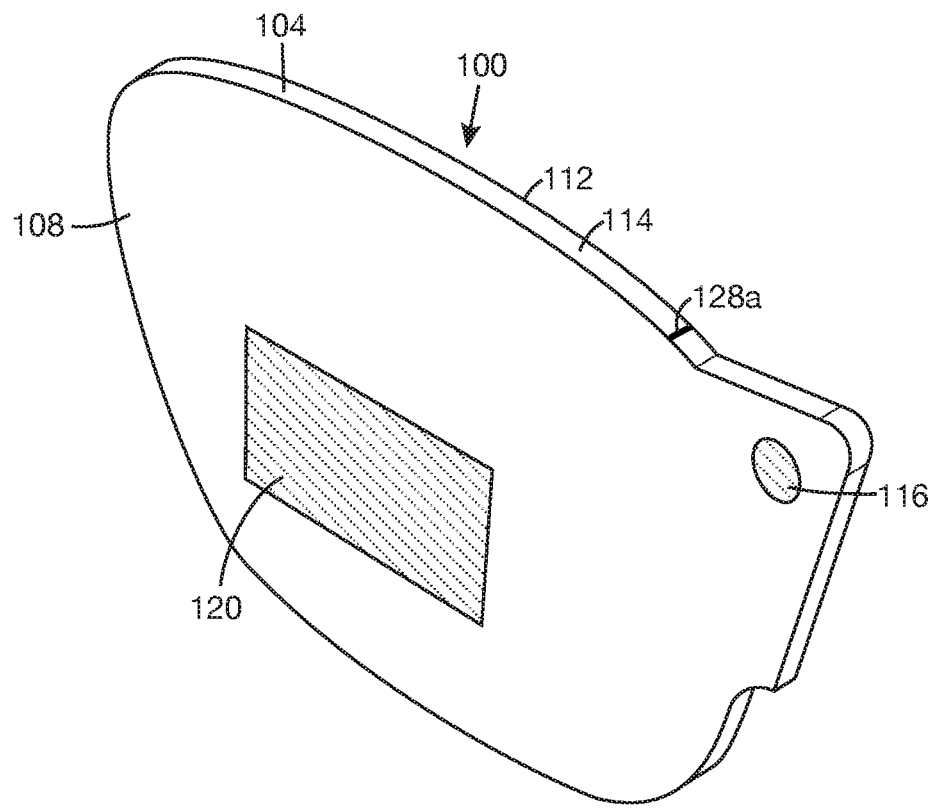
FIG. 1 is an isometric view of an optical combiner according to one implementation in accordance with some embodiments.
Figure 2:
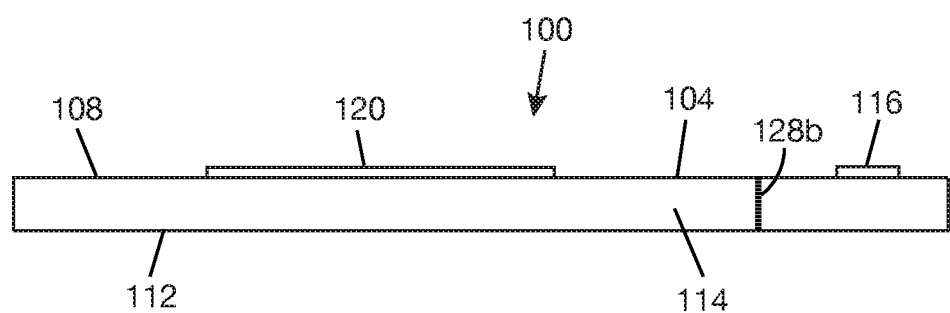
FIG. 2 is an edge surface view of the optical combiner of FIG. 1 in accordance with some embodiments.

FIGS. 1 and 2 show an optical combiner 100 including a lightguide 104, which may also be referred to as a waveguide (the terms "lightguide" and "waveguide" are often used interchangeably). In the illustrated example, lightguide 104 is an optical substrate that is capable of transmitting light. In another example, lightguide 104 may be an optical structure that is capable of transferring light by total internal reflection (TIR). An example of an optical structure that is capable of transferring light by TIR is a core layer that is disposed between two cladding layers, where the core layer has a higher refractive index compared to each of the cladding layers. Lightguide 104 has front surface 108, back surface 112, and edge surface 114. Front and back surfaces 108, 112 are separated by a substrate thickness of lightguide 104. Edge surface 114 wraps around a perimeter of lightguide 104. In the illustrated example, front and back surfaces 108, 112 are planar surfaces. Alternatively, at least one of front and back surfaces 108, 112 may be a non-planar surface, e.g., a curved surface (i.e., a surface that is not lying flat on a plane) or a complex surface (i.e., a surface having a combination of curved and planar surfaces). Lightguide 104 is transparent to at least some electromagnetic wavelengths, e.g., wavelengths in the visible range and/or infrared (IR) range. Lightguide 104 may be made of plastic or glass or other optical material suitable for making lenses. One or more coatings, such as anti-scratch coating, anti-reflective coating, and/or IR-blocking coating may be applied to any of front and back surfaces 108, 112. Stray light from edge surface 114 may be managed by partially or entirely covering edge surface 114 with a light absorbing material or structure.

Optical combiner 100 may include an in-coupler 116 and an out-coupler 120. In-coupler 116 is designed and positioned to receive an incident light with a field of view (FOV) and couple the light into lightguide 104. Out-coupler 120 is designed and positioned to couple light out of lightguide 104. Each of in-coupler 116 and out-coupler 120 may be an optical grating. An optical grating with the desired optical functions can be designed with, for example, surface relief grating(s) or volume hologram grating(s) or metasurface(s). Couplers 116, 120 may be of the transmission type, meaning that the coupler transmits light and applies designed optical function(s) to the light during transmission, or of the reflection type, meaning that the coupler reflects light and applies designed optical function(s) to the light during reflection. In some cases, in-coupler 116 may be a prism. In other cases, optical combiner 100 may not include in-coupler 116, and light may be coupled into lightguide 104 directly through a surface of lightguide 104 (e.g., a portion of any of surfaces 108, 112, 114 in an input region of lightguide 104). In one implementation, couplers 116, 120 are carried by (e.g., integrated with or attached to or embedded in a surface of) lightguide 104. In the illustrated example, couplers 116, 120 are positioned on or proximate front surface 108. In other examples, either or both of couplers 116, 120 may be positioned on or proximate back surface 112.

Figure 3:
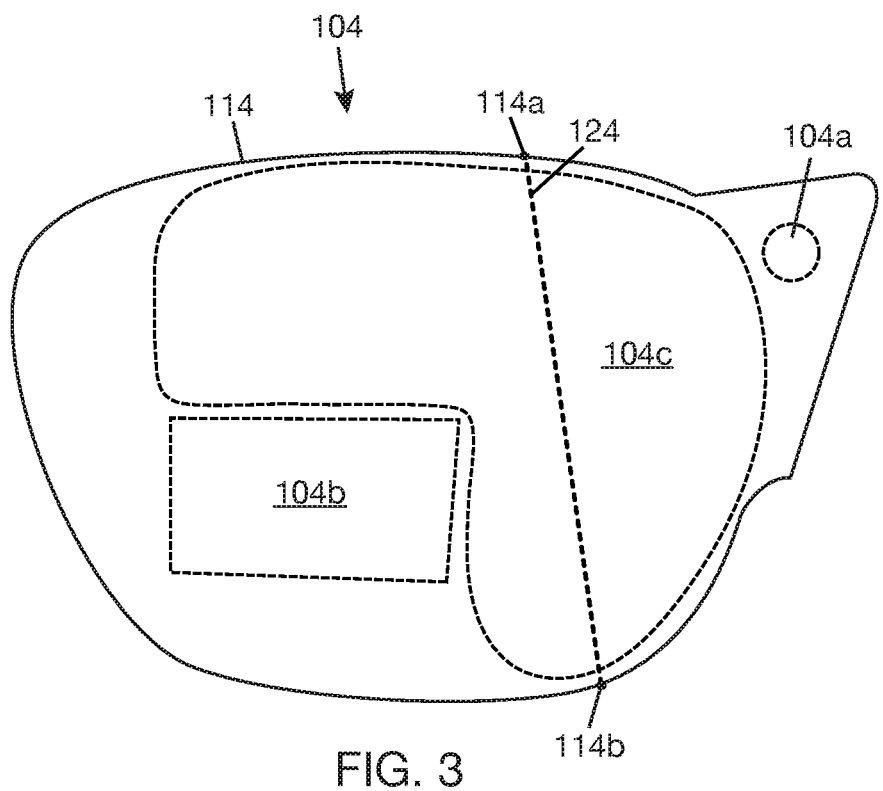
FIG. 3 is a plan view of the lightguide of FIG. 1 showing a line of weakness that is intermediate between an input region and an output region according to one implementation in accordance with some embodiments.

FIG. 3 shows lightguide 104 with input region 104a, output region 104b, and relay region 104c. Input region 104a is the portion of lightguide 104 that is in registration with (or that carries) in-coupler 116 (in FIG. 1). Output region 104b is the portion of lightguide 104 that is in registration with (or that carries) out-coupler 120 (in FIG. 1). Relay region 104c is an intermediate region between input region 104a and output region 104b. Light may be guided from input region 104a to output region 104b through relay region 104c. In implementations herein, a line (or path) of weakness, illustrated by dotted line 124, is defined in lightguide 104. When lightguide 104 is subjected to excess load, line of weakness 124 represents where lightguide is most likely to fail (e.g., fracture) in response to the excess load. The portion of lightguide 104 along and around the line of weakness will generally have a reduced mechanical strength compared to other portions of the lightguide 104. Line of weakness 124 is intermediate between input region 104a and output region 104b and extends across relay region 104c. If lightguide 104 fails along line of weakness 124, propagation of light from input region 104a to output region 104c through relay region 104c will be interrupted at line of weakness 124. Also, light may leak from any fractures along line of weakness 124. By positioning line of weakness 124 away from output region 104b, the pupil of the eye may be protected from direct exposure to any uncontrolled light leaks from fracture(s) that develop along line of weakness 124.

Figure 4:
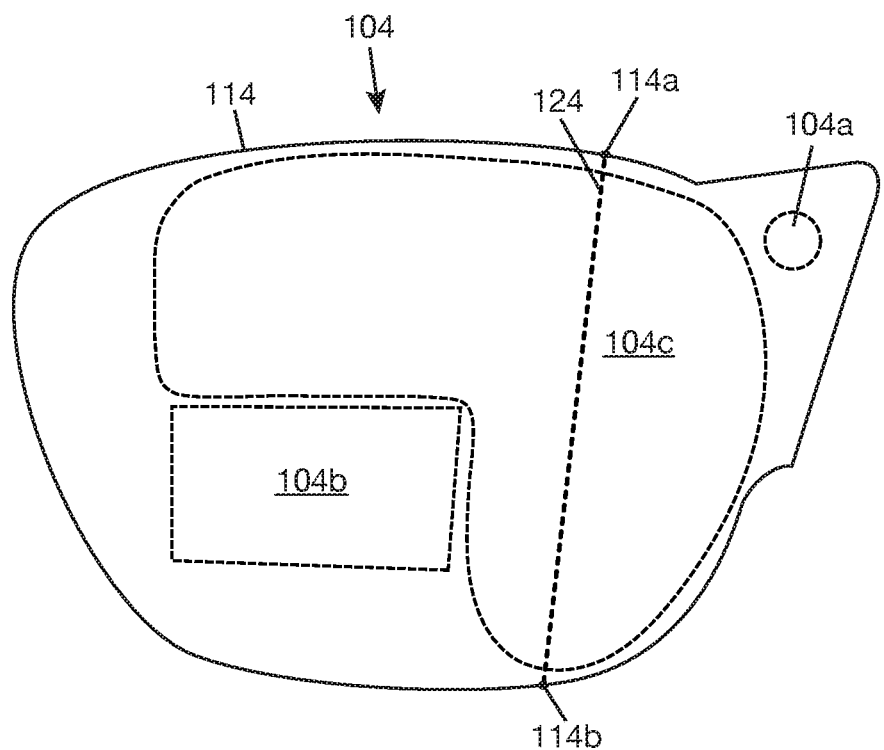
FIGS. 4 and 5 are alternative plan views of the lightguide of FIG. 3 showing alternative orientations of the line of weakness in accordance with some embodiments.
Figure 5:
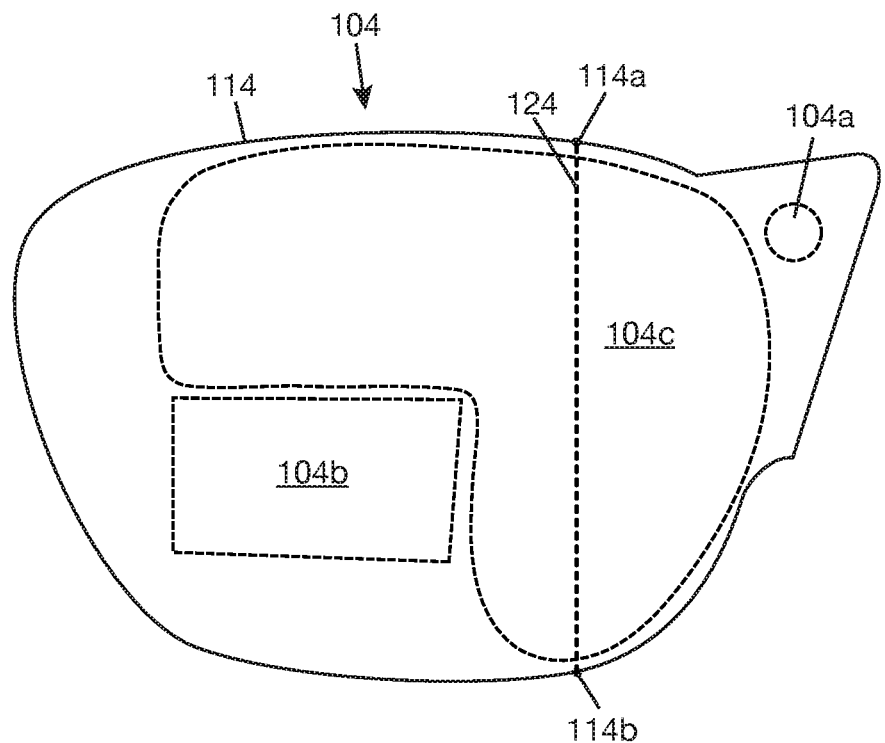

Line of weakness 124 may exist in various orientations in relay region 104c. For example, line of weakness 124 could slant towards output region 104b as shown in FIG. 3 or could slant towards input region 104a as shown in FIG. 4 or could be substantially vertical as shown in FIG. 5. Line of weakness 124 may be generally linear, as illustrated in FIGS. 3-5, or may be non-linear, or may have generally linear sub-paths with different orientations. Line of weakness 124 is defined by (or includes) one or more stress raisers (or stress concentrations) formed at predetermined locations in lightguide 104. The stress raisers may define the end points of the line and/or may define intermediate points on the line. The stress raisers may be located on edge surface 114 (also, see FIG. 1) and/or within relay region 104c. Stress raisers may be geometric discontinuities on a surface of lightguide 104 or may be structural modifications within the material of lightguide 104. Stress raisers located within the bulk of lightguide 104 are preferably transparent to at least some electromagnetic wavelengths, e.g., wavelengths in the visible range. In some cases, stress raisers located within the bulk of lightguide 104 may be ultrathin in width, e.g., thinner than hairline, so as to be virtually imperceptible to the naked eye.

Figure 6A:
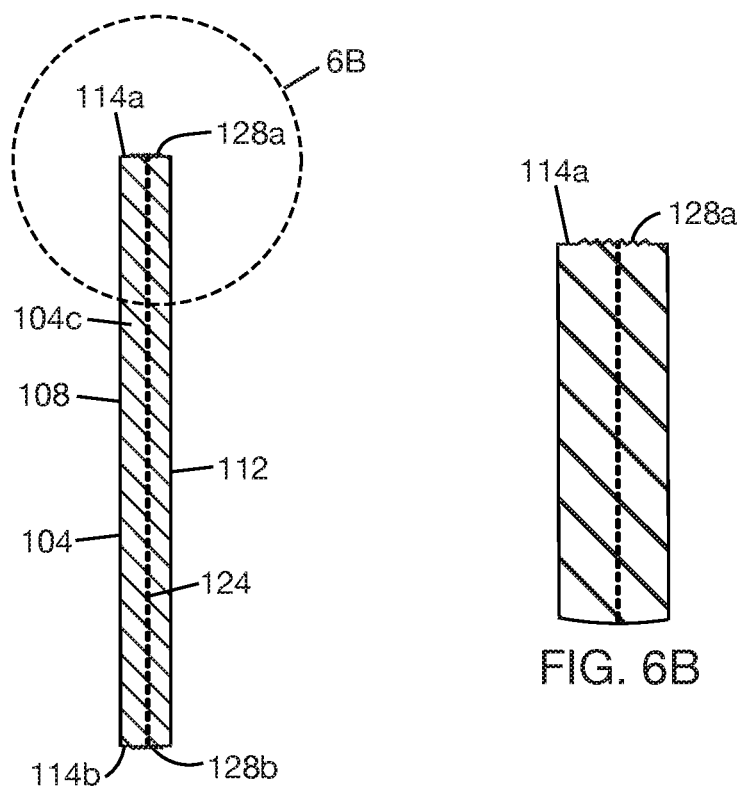
FIG. 6A is a cross-sectional view of the lightguide of FIG. 3 along the line of weakness in accordance with some embodiments.
Figure 6B:
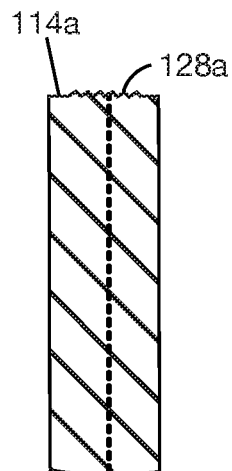
FIG. 6B is an enlargement of a portion of FIG. 6A within circle 6B in accordance with some embodiments.

FIG. 6A shows a cross-section of lightguide 104 through line of weakness 124 (in FIG. 3) according to one example. In this example, a stress raiser 128a (also, see FIG. 1) is formed at a location 114a (also, see FIG. 3) on a top portion of edge surface 114, and a stress raiser 128b is formed at a location 114b (also, see FIG. 3) on a bottom portion of edge surface 114. In this example, line of weakness 124 is a linear path extending from stress raiser 128a, across relay region 104c, to stress raiser 128b. Stress raisers 128a, 128b may be thin-width areas (see FIGS. 1 and 2) extending entirely or partway across an axial thickness of lightguide 104. In one example, each of stress raisers 128a, 128b includes one or more geometric discontinuities (e.g., notches, holes, grooves, sharp corners, and the like) formed at edge surface locations 114a, 114b, respectively. For example, stress raisers 128a and 128b may be sawtooth surfaces formed at locations 114a, 114b (see stress raiser 128a in FIG. 6B). These geometric discontinuities are typically microscopic features that concentrate stress at the respective locations 114a, 114b. Stress raisers 128a, 128b may be formed by surface roughening techniques, such as polishing, grinding, and the like. If the geometric discontinuities that form the stress raisers 128a, 128b are considered to be defects, then the level of defect at locations 114a, 114b of the stress raisers should be much higher than elsewhere on edge surface 114.

Figure 7A:
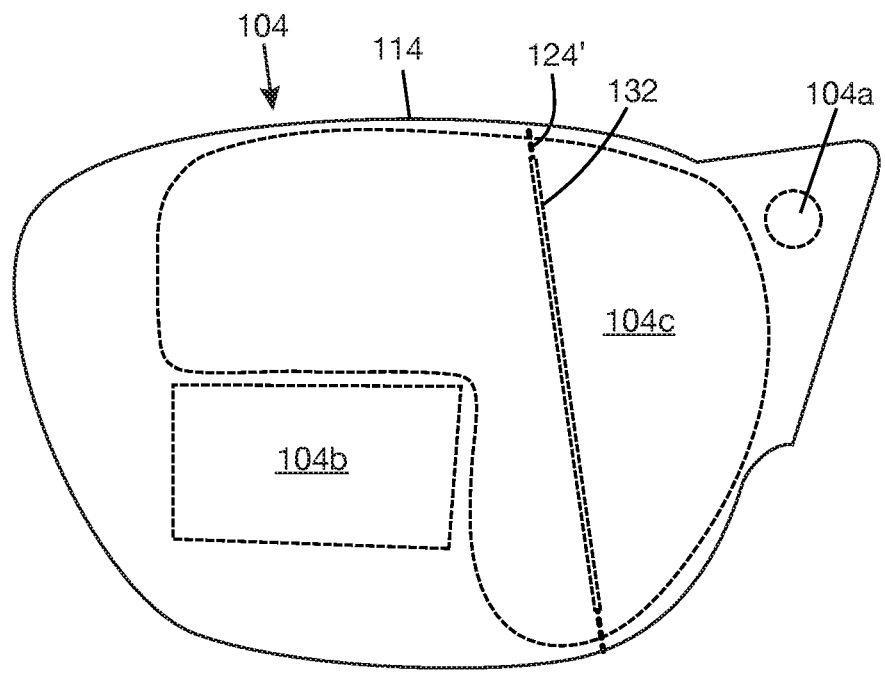
FIG. 7A is a plan view of a lightguide showing a line of weakness defined by a buried stress region according to one implementation in accordance with some embodiments.
Figure 7B:
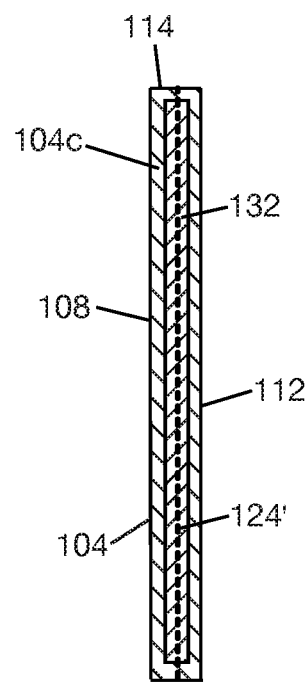
FIG. 7B is a cross-sectional view of the lightguide of FIG. 7A along the line of weakness in accordance with some embodiments.

FIG. 7A shows a stress raiser 132 formed within relay region 104c. The longitudinal axis of stress raiser 132 is aligned with line of weakness 124' (or line of weakness 124' extends along the longitudinal axis of stress raiser 132). FIG. 7B shows a cross-section of lightguide 104 through line of weakness 124'. Stress raiser 132 is a stress region that is buried within relay region 104c. In one example, stress raiser 132 is formed within relay region 104c by applying laser power to relay region 104c in a direction that defines the longitudinal axis of stress raiser 132 and line of weakness 124'. The selected laser operates at a wavelength that is absorbed by the lightguide material. The laser power is set below a level at which the laser can score the lightguide material and/or the exposure time of the laser power is set below a level at which the laser can score the lightguide material. The absorbed laser power induces stress in the lightguide material, thereby forming stress raiser 132 and line of weakness 124'.

Figure 8A:
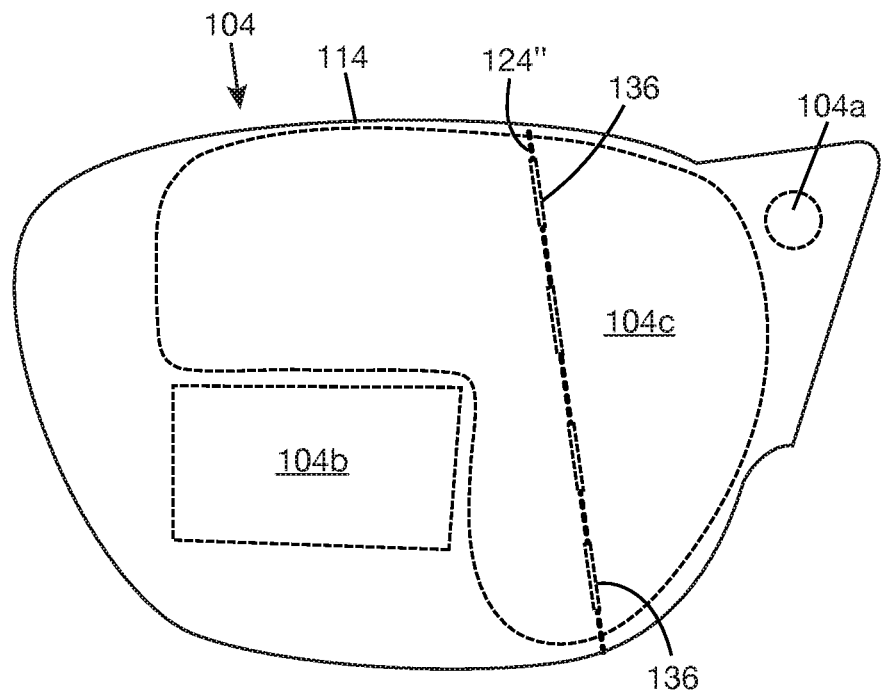
FIG. 8A is a plan view of a lightguide showing a line of weakness defined by a series of buried stress regions in accordance with some embodiments.
Figure 8B:
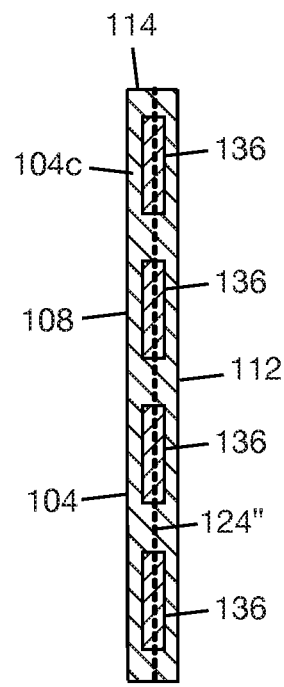
FIG. 8B is a cross-sectional view of the lightguide of FIG. 8A along the line of weakness in accordance with some embodiments.

FIG. 8A shows a series of stress raisers 136 formed within relay region 104c. Stress raisers 136 are longitudinally aligned and spaced apart along line of weakness 124″ (or line of weakness 124″ extends along the longitudinal axis of the series of stress raisers 136). FIG. 8B shows a cross-section of lightguide 104 through line of weakness 124″. Each stress raiser 136 is a stress region that is buried within relay region 104c—each stress region 136 may be laser induced in relay region 104c, as described above for stress raiser 132 (in FIGS. 7A and 7B). The spaced-apart stress regions 136 create paths through which portions of light may move through relay region 104c without encountering stress regions. This may reduce any adverse effects of stress regions on the optical quality of the light propagating through relay region 104c to output region 104b.

Figure 9:
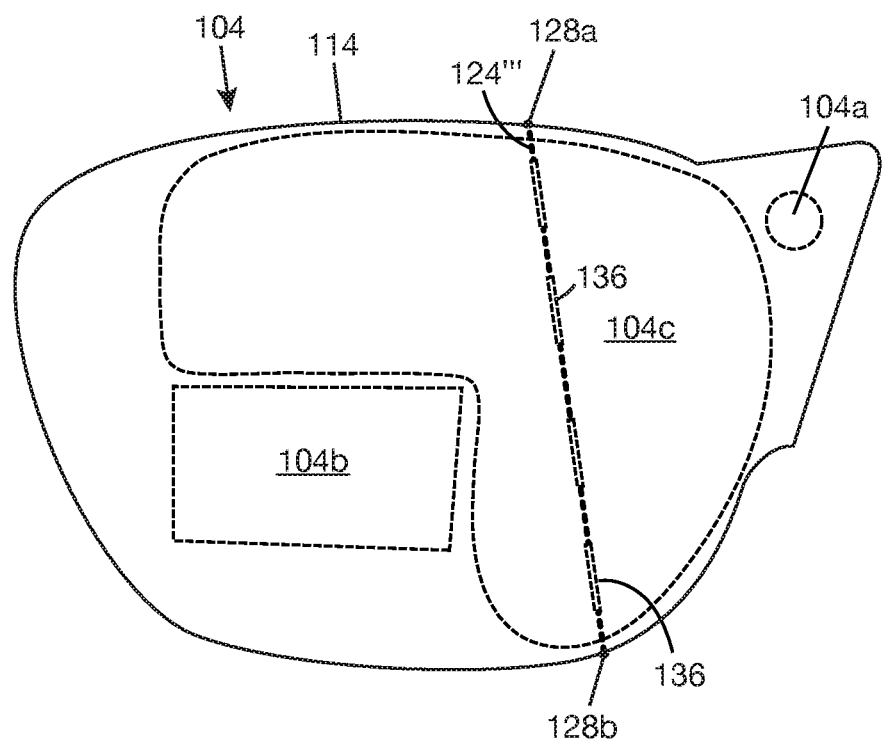
FIG. 9 is a plan view of a lightguide showing a line of weakness defined by geometric discontinuities and buried stress regions in accordance with some embodiments.

In an alternative example, the line of weakness in the lightguide may be defined using a combination of stress raisers that include geometric discontinuities on a surface of lightguide 104 and stress raisers that include buried stress regions within lightguide 104. For example, as illustrated in FIG. 9, line of weakness 124‴ may have end points defined by geometric discontinuity stress raisers 128a, 128b on edge surface 114 and intermediate point(s) defined by buried stress region(s) 136 within relay region 104c.

Figure 10:
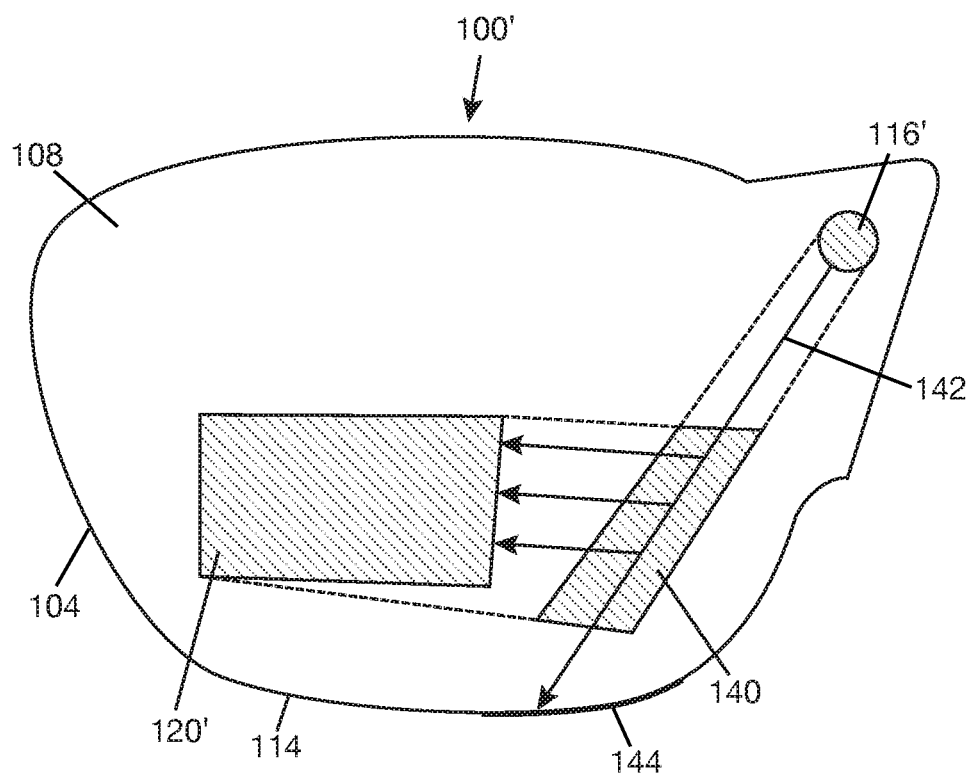
FIG. 10 is a plan view of an optical combiner including an exit pupil expander (EPE) in accordance with some embodiments.

FIG. 10 shows an optical combiner 100′ including lightguide 104, in-coupler 116′, out-coupler 120′, and an exit pupil expander (EPE) 140. EPE 140 is an optical structure that is used to increase the size of the display exit pupil. EPE 140 may be made of diffractive or refractive elements. In one example, EPE 140 is a fold grating (or optical grating in general) and may be designed with, for example, surface relief grating(s), volume hologram grating(s), or metasurface(s). In-coupler 116′ and out-coupler 120′ may have the characteristics previously described for in-coupler 116 (in FIG. 1) and out-coupler 120 (in FIG. 1), respectively. In-coupler 116′ couples light into a propagation path 142. EPE 140 is positioned to receive light traveling along propagation path 142. A portion of the light traveling along propagation path 142 will be expanded and redirected to out-coupler 120′ by EPE 140. The light that is not redirected to out-coupler 120′ by EPE 140 will continue to travel towards edge surface 114 of lightguide 104. A light dump, illustrated at 144, may be positioned at the edge surface of lightguide 104 to manage stray light at edge surface 114. For example, the light dump could be a material or coating that absorbs and/or scatters light. Light dump 144 may be a portion of a material or coating applied on edge surface 114.

Figure 11A:
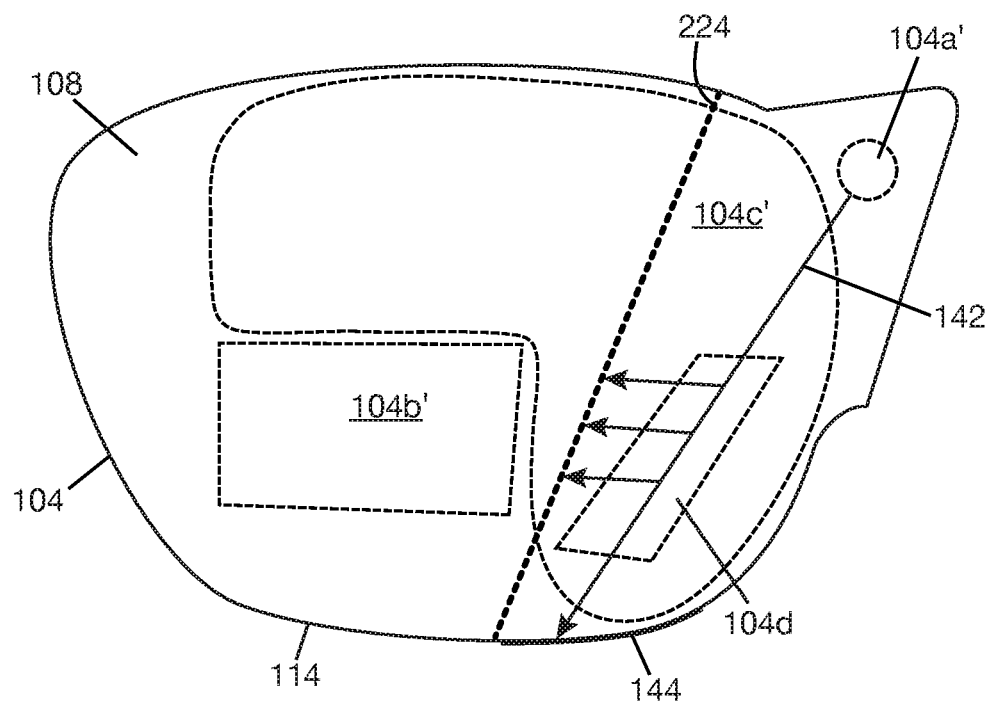
FIG. 11A is a plan view of the lightguide of FIG. 10 showing a line of weakness that is intermediate between an expander region and an output region in accordance with some embodiments.

FIG. 11A shows lightguide 104 with input region 104a′, output region 104b′, relay region 104c′, and an expander region 104d. Input region 104a′ is the portion of lightguide 104 that is in registration with (or that carries) in-coupler 116′ (in FIG. 10). Output region 104b′ is the portion of lightguide 104 that is in registration with (or that carries) out-coupler 120′ (in FIG. 10). Relay region 104c′ is the portion of lightguide 104 intermediate between input region 104a and output region 104b. Expander region 104d is the portion of lightguide 104 that is in registration with (or that carries) EPE 140 (in FIG. 10). Expander region 104d is a sub-region of relay region 104c′. Lightguide 104 has a line of weakness, illustrated by dotted line 224. Line of weakness 224 may exist in various orientations in relay region 104c′ (see example orientations of line of weakness 124 in FIGS. 3-5). Line of weakness 224 extends across relay region 104c′ generally without crossing expander region 104d. Line of weakness 224 includes one or more stress raisers, which may be geometric discontinuities on a surface of lightguide 104 and/or structural modifications within the material of lightguide 104, as previously described with respect to any of lines of weakness 124, 124′, 124″, 124‴ (FIGS. 3-9) Any method of forming a line of weakness previously described is applicable to forming line of weakness 224.

In FIG. 11A, input region 104a′ and expander region 104d are on the same side of line of weakness 224, and output region 104b′ is on the other side of line of weakness 224. Line of weakness 224 is intermediate between expander region 104d and output region 104b′. A portion of light propagating along propagation path 142 will be directed from expander region 104d, by EPE 140 (in FIG. 10), towards output region 104b′. Light that is not redirected towards output region 104b′ will continue to propagate to edge surface 114 of lightguide 104, where it can be received by light dump 144. In the event that lightguide 104 fails along line of weakness 224, propagation of light from expander region 104d towards output region 104b′ will be interrupted at line of weakness 224, and light may leak out of fracture(s) along line of weakness 224. The EPE (140 in FIG. 10) at expander region 104d does not interact with the majority of the light traveling along propagation path 142. Thus, a higher percentage of the light traveling along propagation path 142 will reach edge surface 114 compared to the percentage of the light that will reach line of weakness 224. This means that the volume of leakage through fracture(s) that develop along line of weakness 224 from propagation path 142 will be relatively low. Also, the power of the light leaked through fracture(s) at line of weakness 224 will be much lower than the power of light coupled into input region 104a, i.e., because expander region 104d is further downstream of propagation path 142 compared to input region 104a″.

Figure 11B:
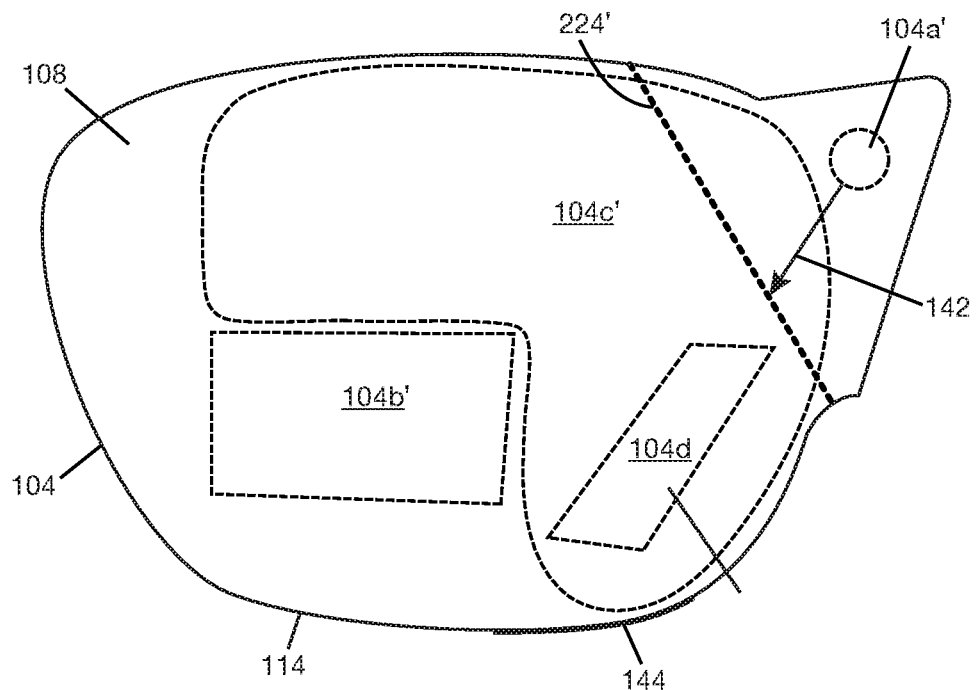
FIG. 11B is a plan view of the lightguide of FIG. 10 showing a line of weakness that is intermediate between an input region and an expander region in accordance with some embodiments.

FIG. 11B shows an alternative example where input region 104a′ is on one side of line of weakness 224′, and expander region 104d and output region 104b′ are on the other side of line of weakness 224′. In this example, line of weakness 224′ is intermediate between input region 104a′ and expander region 104d. In the event that lightguide 104 fails along line of weakness 224′, propagation of light will be interrupted at line of weakness 224′, and light may leak out of fracture(s) at line of weakness 224′. Since line of weakness 224′ is closer to input region 104a′, the light leaking out of fault(s) at line of weakness 224′ will have a much higher power compared to the light leaking out of line of weakness 224 in FIG. 11A. On the other hand, line of weakness 224′ is farther from output region 104b′ compared to line of weakness 224 in FIG. 11A—this means that the light leakage is happening in a region of the lightguide that is unlikely to be aligned with the pupil of the eye.

Figure 12:
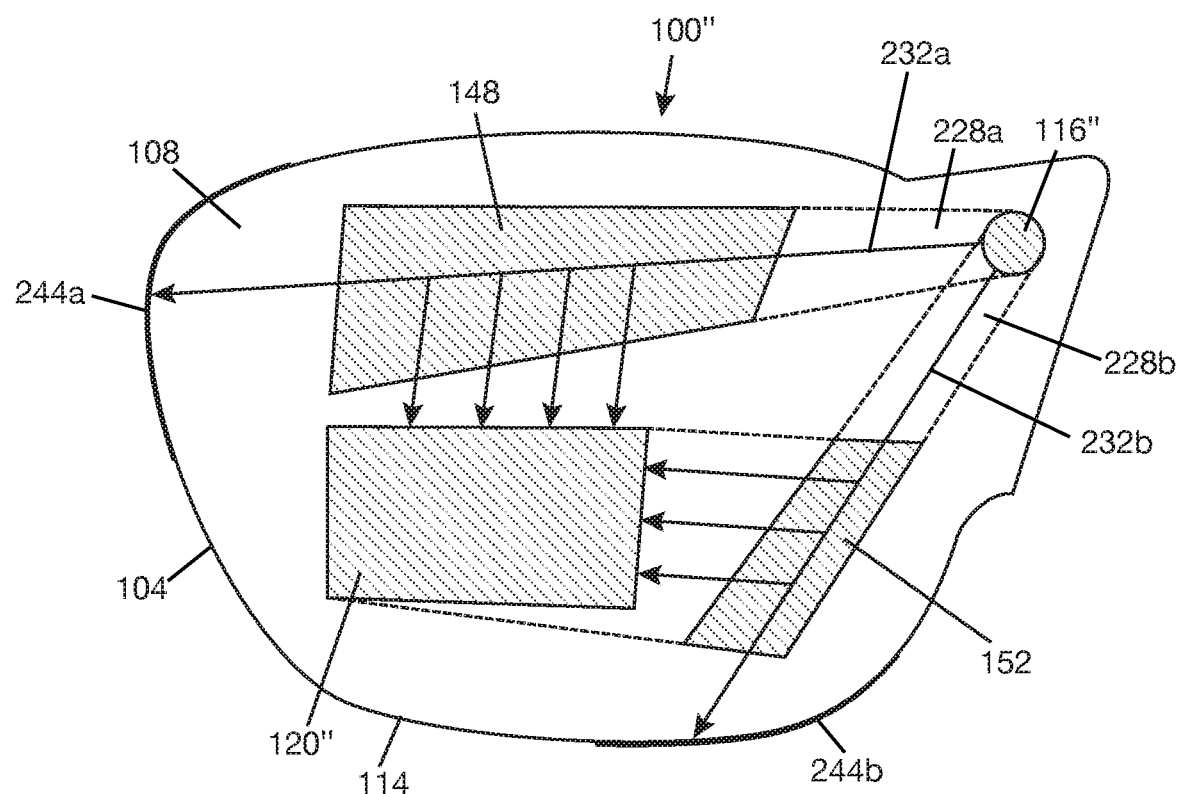
FIG. 12 is a plan view of an optical combiner including two EPEs in accordance with some embodiments.

FIG. 12 shows an optical combiner 100″ including lightguide 104, in-coupler 116″, out-coupler 120″, and two EPEs, i.e., EPE 148 and EPE 152. EPEs 148, 152 are optical structures that are used to increase the size of the display exit pupil. EPEs 148, 152 may be made of diffractive or refractive elements. In one example, EPEs 148, 152 may be fold gratings (or optical gratings in general) and may be designed with, for example, surface relief grating(s), volume hologram grating(s), or metasurface(s). In-coupler 116″ and out-coupler 120″ may be optical gratings. Examples of suitable optical couplers for use with dual EPEs are described, for example, in U.S. Provisional Application No. 62/846,979 ("Single RGB Combiner with Large Field of View"). In-coupler 116″ is designed to receive light with a FOV and split the light into a first light portion 228a having a first part of the FOV and a second light portion 228b having a second part of the FOV. The first light portion 228a is coupled into a first propagation path 232a. The second light portion 228b is coupled into a second propagation path 232b. EPE 148 is positioned to receive light traveling along propagation path 232a. A portion of the light traveling along propagation path 232a will be expanded and redirected to out-coupler 120" by EPE 148. The light that is not redirected to out-coupler 120" by EPE 148 will continue to travel towards edge surface 114 of lightguide 104. A light dump, illustrated at 244a, may be positioned at the edge surface of lightguide 104 to receive the excess light. EPE 152 is positioned to receive light traveling along propagation path 232b. A portion of the light traveling along propagation path 232b will be expanded and redirected to out-coupler 120' by EPE 152. The light that is not redirected to out-coupler 120' by EPE 152 will continue to travel towards edge surface 114 of lightguide 104. A light dump, illustrated at 244b, may be positioned at edge surface 114 to receive the excess light. Light dumps 244a, 224b may be portions of a material or coating applied on edge surface 114.

Figure 13A:
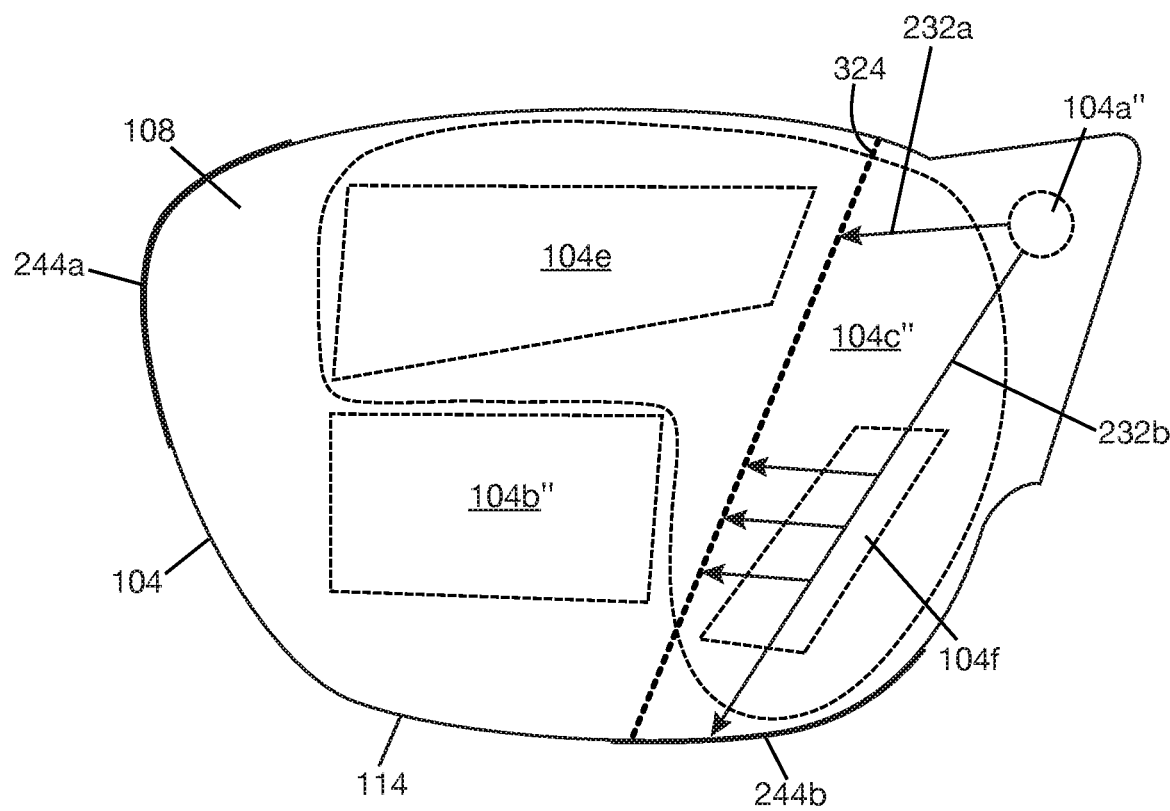
FIG. 13A is a plan view of the lightguide of FIG. 12 showing a line of weakness that is intermediate between two expander regions in accordance with some embodiments.

FIG. 13A shows lightguide 104 with input region 104a", output region 104b", relay region 104c", and expander regions 104e, 104f. Input region 104a" is the portion of lightguide 104 that is in registration with (or that carries) in-coupler 116" (in FIG. 12). Output region 104b" is the portion of lightguide 104 that is in registration with (or that carries) out-coupler 120" (in FIG. 12). Relay region 104c" is the portion of lightguide 104 intermediate between input region 104a" and output region 104b". Expander region 104e is the portion of lightguide 104 that is in registration with (or that carries) EPE 148, and expander region 104f is the portion of lightguide 104 that is in registration with (or that carries) EPE 152. Both expander regions 104e and 104f are sub-regions of relay region 104c". Lightguide 104 has a line of weakness, illustrated by dotted line 324. Line of weakness 324 extends across relay region 104c" generally without crossing either of expander regions 104e, 104f. Line of weakness 324 includes one or more stress raisers, which may be geometric discontinuities on a surface of lightguide 104 and/or structural modifications within the material of lightguide 104 as previously described with respect to paths of weakness 124, 124', 124", 124'" (FIGS. 3-9). Any method of forming a line of weakness previously described is applicable to forming line of weakness 324.

In FIG. 13A, input region 104a" and expander region 104f are on the same side of line of weakness 324, and output region 104b" and expander region 104e are on the other side of line of weakness 324. Line of weakness 324 is intermediate between input region 104a" and expander region 104e. Line of weakness 324 is intermediate between output region 104b" and expander region 104f. Line of weakness 324 is also intermediate between expander regions 104e, 104f. A portion of light propagating along propagation path 232a will be redirected from expander region 104e, by EPE 148 (in FIG. 12), towards output region 104b". Light that is not redirected towards output region 104b" from propagation path 232a will continue to propagate to edge surface 114 of lightguide 104, where it can be received in light dump 244a. In the event that lightguide 104 fails along line of weakness 324, propagation of light from input region 104a" towards expander region 104e will be interrupted at line of weakness 324, and light may leak out of fracture(s) along line of weakness 324. A portion of light propagating along propagation path 232b will be redirected from expander region 104f, by EPE 152 (in FIG. 12), towards output region 104b". Light that is not redirected towards output region 104b" from propagation path 232b will continue to propagate to edge surface 114 of lightguide 104, where it can be received in light dump 244b. In the event that lightguide 104 fails along line of weakness 324, propagation of light from expander region 104f towards output region 104b" will be interrupted at line of weakness 324, and light may leak out of fracture(s) along line of weakness 324. The EPE (152 in FIG. 12) at expander region 104f does not interact with the majority of the light traveling along propagation path 232b. Thus, a higher percentage of the light traveling along propagation path 232b will reach edge surface 114 compared to the percentage of the light that will reach line of weakness 324. This means that the volume of leakage through fracture(s) that develop along line of weakness 224 from propagation path 232b will be relatively low.

One of the uses of dual EPE is to allow the optical combiner to support a larger FOV than would be possible with a single EPE. The larger FOV supported by a dual EPE will generally employ a higher energy input into the lightguide compared to the FOV supported by a single EPE. The laser safety margin for the dual EPE combiner can be improved by splitting the light at input region 104a", by design of in-coupler 116" (in FIG. 12), such that the first light portion (228a in FIG. 12) coupled into propagation path 232a has a lower optical energy compared to the second light portion (228b in FIG. 12) coupled into propagation path 232b. This means that the light from propagation path 232a that leaks at fracture(s) at line of weakness 324, i.e., in the event that lightguide 104 fails, will be relatively low energy light. The higher energy light will propagate along propagation path 232b to expander region 104f. However, as explained above, only a relatively small fraction of this light will be redirected to line of weakness 324 by EPE 152 (in FIG. 12). Thus, in the event of lightguide failure, there will be low volume leakage from propagation path 232b and lower power leakage from propagation path 232a.

In one example, splitting of light by in-coupler 116" (in FIG. 12) may be such that the first light portion (228a in FIG. 12) coupled into the first propagation path 232a has a first part of the FOV and the second light portion (228b in FIG. 12) coupled into the second propagation path 232b has a second part of the FOV, where the second part of the FOV is greater than the first part of the FOV in dimensions. For example, the second light portion may have the top two-thirds of the FOV, and the first light portion may have the bottom one-third of the FOV. That is, a larger portion of the FOV is directed along second propagation path 232b compared to along first propagation path 232a.

In another example, the splitting of light by in-coupler 116" (in FIG. 12) may be such that the first light portion (228a in FIG. 12) coupled into first propagation path 232a has a first part of the FOV and the second light portion (228b in FIG. 12) coupled into second propagation path 232b has a second part of the FOV, where the second part of the FOV includes a blue light portion of the FOV and the first part of the FOV excludes the blue light portion of the FOV. Consider that in-coupler 116" receives an incident light with a FOV that is a combination of red, green, and blue lights (i.e., to form a polychromatic display). In one example, the first part of the FOV may include red and green light portions while the second part of the FOV includes blue light portion in one example. In another example, the first part of the FOV may include red light portion and some of the green light portion, while the second part of the FOV includes blue light portion and some of the green light portion. Other splits of the light colors between the propagation paths are possible. In general, blue light has a shorter wavelength compared to red light and green light, and a higher power of blue light tends to be needed to form a display compared to red and green lights. Where the FOV is split by color, the light portion carrying blue light will typically have a higher power compared to the light portion that does not carry blue light.

Figure 13B:
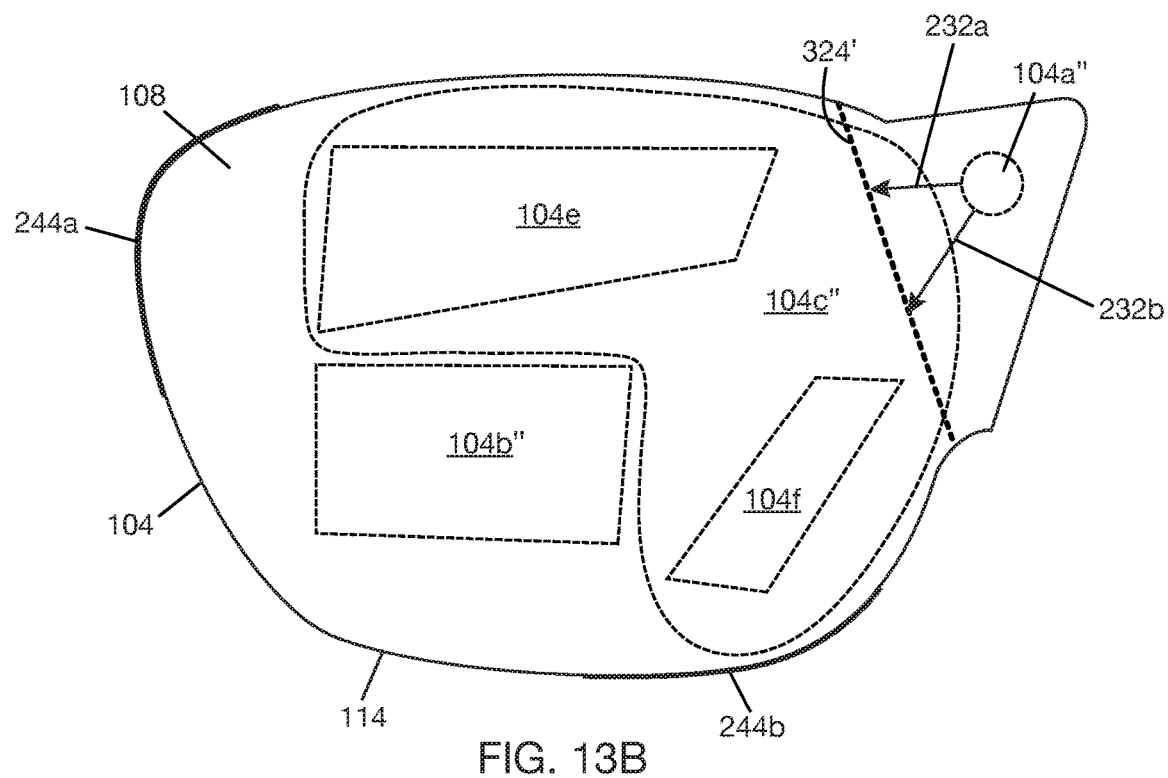
FIG. 13B is a plan view of the lightguide of FIG. 12 showing a line of weakness that is intermediate between an input region and two expander regions in accordance with some embodiments.

Referring to FIG. 13B, it is also possible to position line of weakness 324' intermediate between input region 104a" and expander regions 104e, 104f. That is, line of weakness 324' crosses both propagation paths 232a, 232b. In this case, failure at line of weakness 324' will interrupt propagation of light to expander regions 104e, 104f, and light may leak out of fracture(s) that develop along line of weakness 324'. Since line of weakness 324' is closer to the input region 104a", the light leaking out of fracture(s) at line of weakness 324" will have a much higher power compared to the light leaking out of line of weakness 324 in FIG. 13A. Also, there will be a higher volume leakage compared to the example shown in FIG. 13A since line of weakness 324' crosses both propagation paths 232a, 232b. On the other hand, line of weakness 324' is farther from output region 104b" compared to line of weakness 324 in FIG. 13A—this may mean that the probability of the pupil of the eye being directly exposed to this higher power, higher volume leakage is very low.

Figure 14:
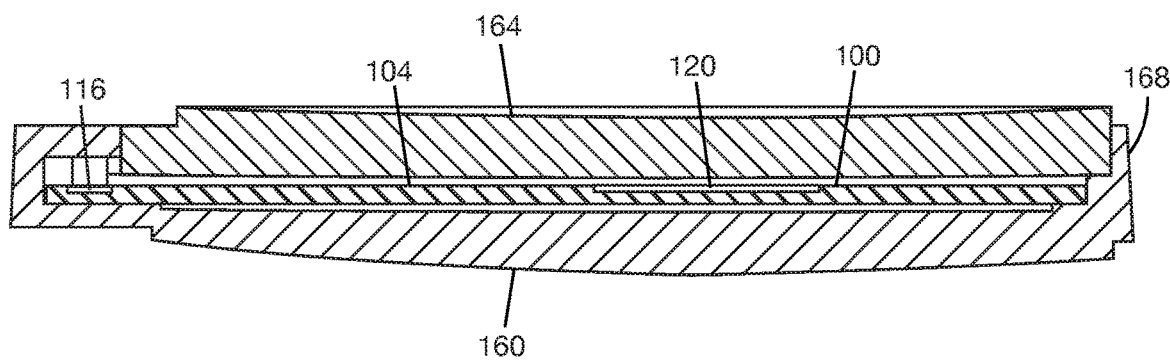
FIG. 14 is a cross-sectional view of a combiner lens in accordance with some embodiments.
Figure 15:
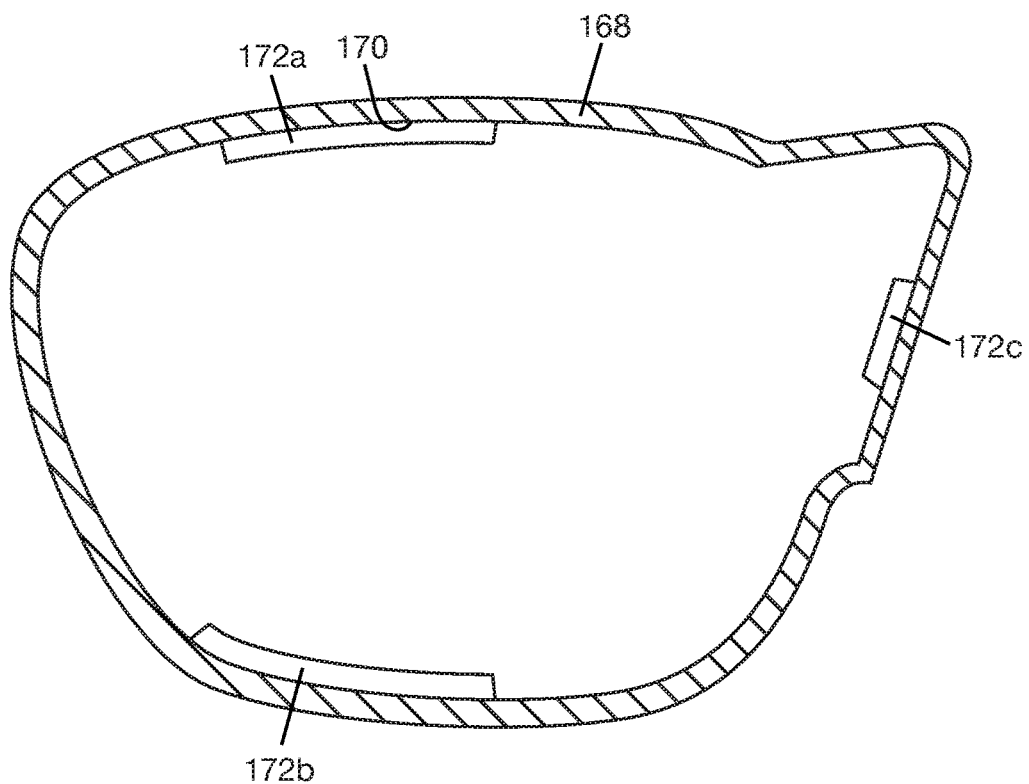
FIG. 15 is a cross-sectional view of a lens with a flange in accordance with some embodiments.
Figure 16:
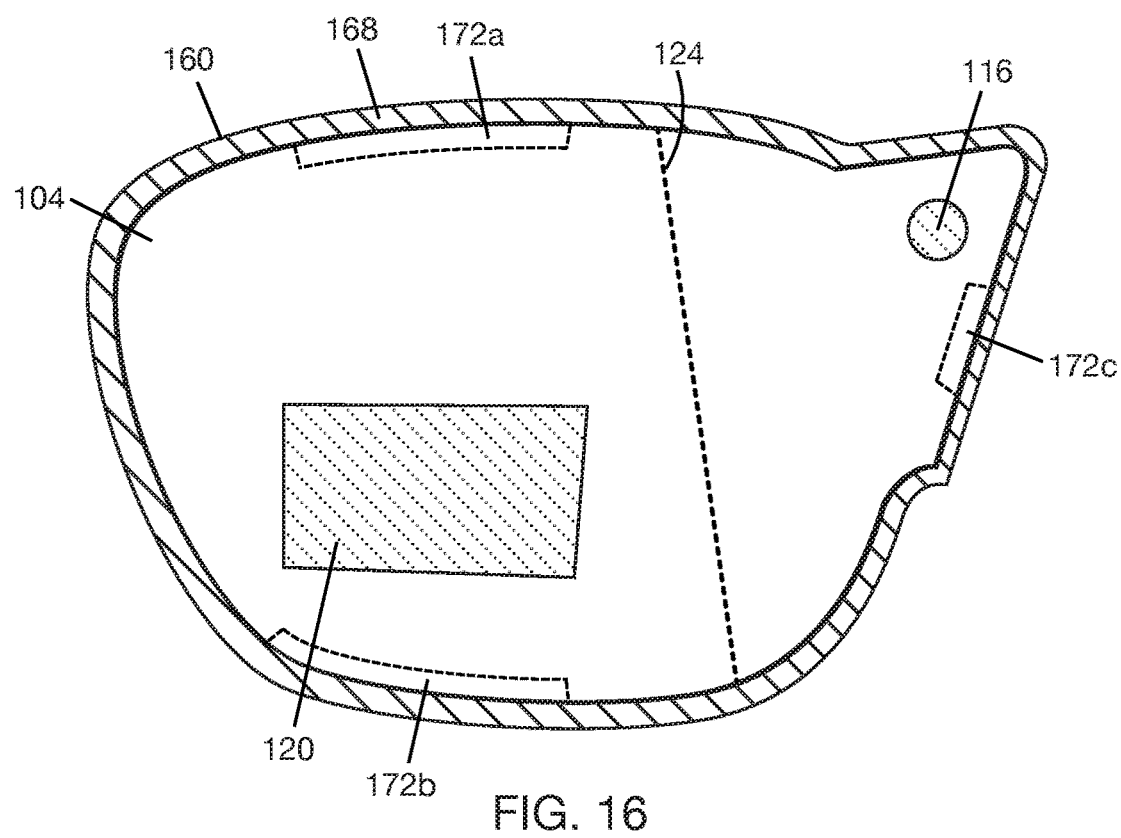
FIG. 16 is a cross-sectional view of a lens with a flange and a combiner lens mounted on supports provided by the flange in accordance with some embodiments.

FIG. 14 shows optical combiner 100 arranged in a stack with lenses 160, 164. Lightguide 104 is in stack with and disposed between lenses 160, 164. Lightguide 104 carries in-coupler 116 and out-coupler 120 as previously described. For convenience, lens 160 may be a world side lens, and lens 164 may be an eye side lens. FIG. 15 shows that world side lens 160 may have a flange 168 with supports 172a, 172b, 172c on which the lightguide of optical combiner 100 can be mounted. Supports 172a, 172b, 172c are spaced apart along an inner circumference 170 of flange 168. FIG. 16 shows lightguide 104 mounted on supports 172a, 172b, 172c. In the illustrated example, supports 172a, 172b, 172c are displaced from line of weakness 124 in lightguide 104 and located on opposite sides of line of weakness 124, leaving the portion of the lightguide 104 including the line of weakness 124 freely suspended (or unsupported) within the stack. In FIGS. 14 and 16, optical combiner 100 may be replaced with optical combiner 100' with single EPE or optical combiner 100" with dual EPE.

In an approach described herein, a line (or path) of weakness is formed in a lightguide such that if the lightguide were to fail, e.g., by fracturing, the lightguide would fail along the line of weakness. The position of the line of weakness in the lightguide determines where light will leak from the lightguide if the lightguide fails. Where the lightguide is transferring laser light, for example, the position of the line of weakness in the lightguide can be selected to mitigate the effect of lightguide failure on laser safety.

In a first aspect of this disclosure, an optical combiner includes a lightguide having an input region at which light enters the lightguide, an output region at which light exits the lightguide, a relay region intermediate between the input region and the output region, and one or more stress raisers positioned to define a line of weakness in the lightguide. The line of weakness is intermediate between the input region and the output region and extends across the relay region. An in-coupler is disposed at the input region to receive an incident light with a field of view (FOV) and couple the incident light into the lightguide. An out-coupler is disposed at the output region to couple light out of the lightguide.

In a second aspect of this disclosure, a combiner lens includes a first lens, a second lens, and an optical combiner according to the first aspect (or a variation thereof), where the lightguide of the optical combiner is in stack with the first lens and the second lens.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An optical combiner, comprising:
a lightguide including:
a relay region intermediate between an input region at which light enters the lightguide and an output region at which light exits the lightguide; and
a line of weakness in the lightguide intermediate between the input region and the output region and that extends across at least a portion of the relay region.

2. The optical combiner of claim 1, wherein the lightguide includes one or more stress raisers that define the line of weakness.

3. The optical combiner of claim 2, wherein the one or more stress raisers include a first stress raiser positioned at a first location on an edge surface of the lightguide.

4. The optical combiner of claim 3, wherein the one or more stress raisers include a second stress raiser positioned at a second location on the edge surface of the lightguide, and wherein the line of weakness extends from the first stress raiser, across the relay region, to the second stress raiser.

5. The optical combiner of claim 3, wherein the first stress raiser comprises a geometric discontinuity formed at the first location on the edge surface of the lightguide.

6. The optical combiner of claim 2, wherein the one or more stress raisers include a stress region formed within the relay region, and wherein the line of weakness extends along a longitudinal axis of the stress region.

7. The optical combiner of claim 6, wherein the stress region is a laser-induced stress region.

8. The optical combiner of claim 2, wherein the one or more stress raisers include a series of stress regions formed within the relay region, the stress regions longitudinally aligned and spaced apart to form the line of weakness.

9. The optical combiner of claim 1, further comprising an exit pupil expander disposed at an expander region that is located within the relay region, wherein the exit pupil expander is positioned to receive a portion of the light coupled into the lightguide and redirect the portion of the light to the output region.

10. The optical combiner of claim 9, wherein the line of weakness is located outside of the expander region.

11. The optical combiner of claim 10, wherein the line of weakness is intermediate between the output region and the expander region.

12. The optical combiner of claim 10, wherein the line of weakness is intermediate between the input region and the expander region.

13. The optical combiner of claim 1, wherein an in-coupler couples an incident light into the input region with a first light portion of the incident light directed towards a first propagation path within the lightguide and a second light portion of the incident light directed towards a second propagation path within the lightguide, and further comprising:
 a first exit pupil expander disposed at a first expander region that is located within the relay region, the first exit pupil expander positioned to receive a portion of the first light portion and redirect the portion of the first light portion to the output region; and
 a second exit pupil expander disposed at a second expander region that is located within the relay region, the second exit pupil expander positioned to receive a portion of the second light portion and redirect the portion of the second light portion to the output region.

14. The optical combiner of claim 13, wherein the line of weakness crosses at least one of the first and second propagation paths.

15. A combiner lens, comprising:
 a lightguide in stack with a first lens and a second lens, the lightguide including an input region, an output region, a relay region intermediate between the input region and the output region, and a line of weakness that is intermediate between the input region and the output region and that extends across the relay region.

16. The combiner lens of claim 15, further comprising supports that hold the lightguide in a stacked relation with the first lens and the second lens, wherein the supports are offset from the line of weakness.

17. The combiner lens of claim 16, wherein the first lens includes a flange, and wherein the supports are projections from a surface of the flange.

18. The combiner lens of claim 17, further comprising at least one fold grating disposed at a portion of the relay region, the at least one fold grating positioned to receive a portion of light coupled into the input region and redirect at least the portion of the light to the output region.

19. The combiner lens of claim 15, wherein the line of weakness is defined by one or more stress raisers including a first stress raiser positioned at a first location on an edge surface of the lightguide and a second stress raiser positioned at a second location on the edge surface of the lightguide, and wherein the line of weakness extends from the first stress raiser, across the relay region, to the second stress raiser.

20. The combiner lens of claim 19, wherein each of the first and second stress raisers comprises at least one geometric discontinuity formed at the respective location on the edge surface of the lightguide.

21. The combiner lens of claim 19, wherein the one or more stress raisers include a laser-induced stress region buried within the relay region, and wherein the line of weakness extends along a longitudinal axis of the laser-induced stress region.

22. The combiner lens of claim 19, wherein the one or more stress raisers include a series of stress regions formed within the relay region, the stress regions longitudinally aligned and spaced apart to form the line of weakness.

23. A wearable heads-up display, comprising:
 a lightguide including:
  a relay region intermediate between an input region at which light enters the lightguide and an output region at which light exits the lightguide; and
  a line of weakness in the lightguide intermediate between the input region and the output region and that extends across at least a portion of the relay region.

* * * * *